(12) United States Patent
Bricaud et al.

(10) Patent No.: US 6,485,319 B2
(45) Date of Patent: Nov. 26, 2002

(54) CARD DETECTING CONNECTOR

(75) Inventors: HervéGuy Bricaud, Dole (FR); Yves Pizard, Dole (FR)

(73) Assignee: ITT Manufacturing Enterprise, Inc., Wilmington, DE (US)

( * ) Notice: Subject to any disclaimer, the term of this patent is extended or adjusted under 35 U.S.C. 154(b) by 0 days.

(21) Appl. No.: 10/010,551

(22) Filed: Nov. 7, 2001

(65) Prior Publication Data

US 2002/0042230 A1 Apr. 11, 2002

Related U.S. Application Data

(60) Division of application No. 09/810,725, filed on Mar. 16, 2001, which is a continuation-in-part of application No. PCT/EP99/06847, filed on Sep. 16, 1999.

(30) Foreign Application Priority Data

Sep. 22, 1998 (FR) .............................................. 98/11788

(51) Int. Cl.[7] .............................................. H01R 29/00

(52) U.S. Cl. ....................................................... 439/188
(58) Field of Search ................................. 439/188, 630; 200/51 R, 51.09, 51.1; 235/482, 441, 492

(56) References Cited

U.S. PATENT DOCUMENTS

| 5,259,777 A | | 11/1993 | Schuder, et al. ............. 439/188 |
| 5,911,587 A | * | 6/1999 | Vermeersch ................. 439/188 |
| 6,039,599 A | * | 3/2000 | Benjamin et al. ............ 439/630 |

FOREIGN PATENT DOCUMENTS

| DE | 195 21 728 A1 | 12/1996 |
| WO | WO 98/33138 | 7/1998 |

* cited by examiner

*Primary Examiner*—Javaid Nasri
(74) *Attorney, Agent, or Firm*—Roger C. Turner

(57) ABSTRACT

A connector has an insulative frame (52) and has rows (34, 36) of identical contacts (70) for engaging pads on a smart card, where at least one of the contacts that otherwise could engage a pad, is used to close or open a switch to detect the presence of a smart card.

7 Claims, 17 Drawing Sheets

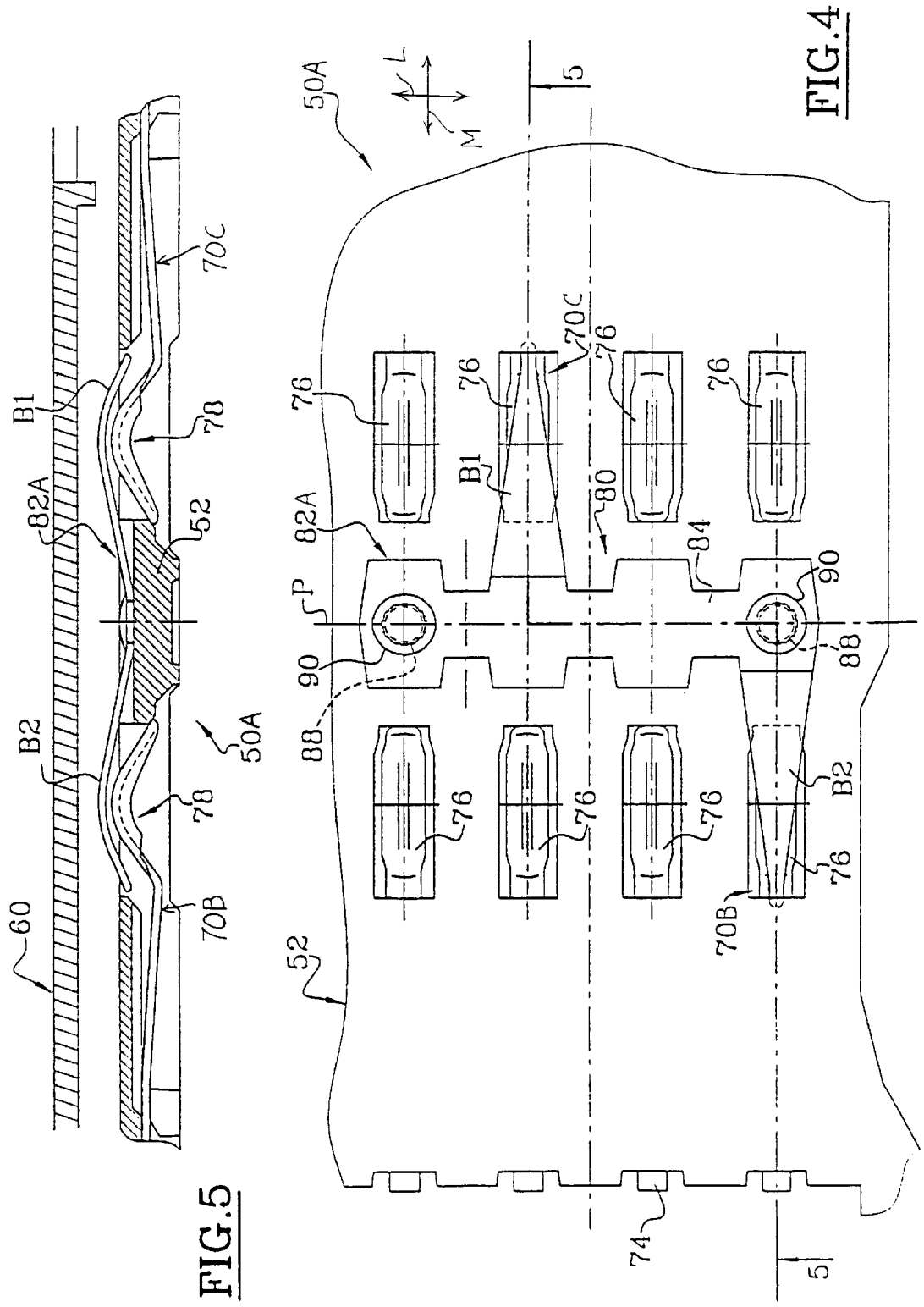

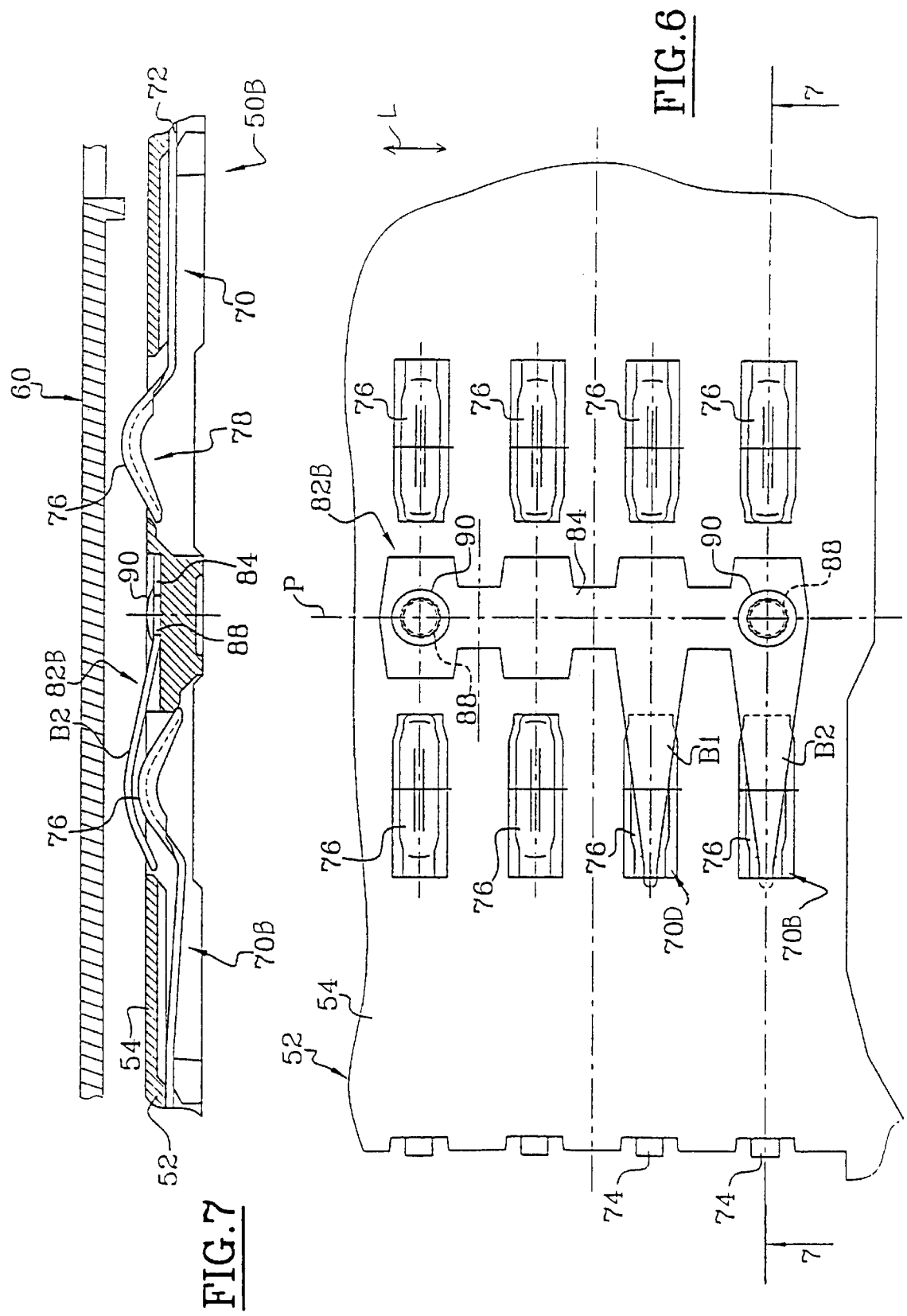

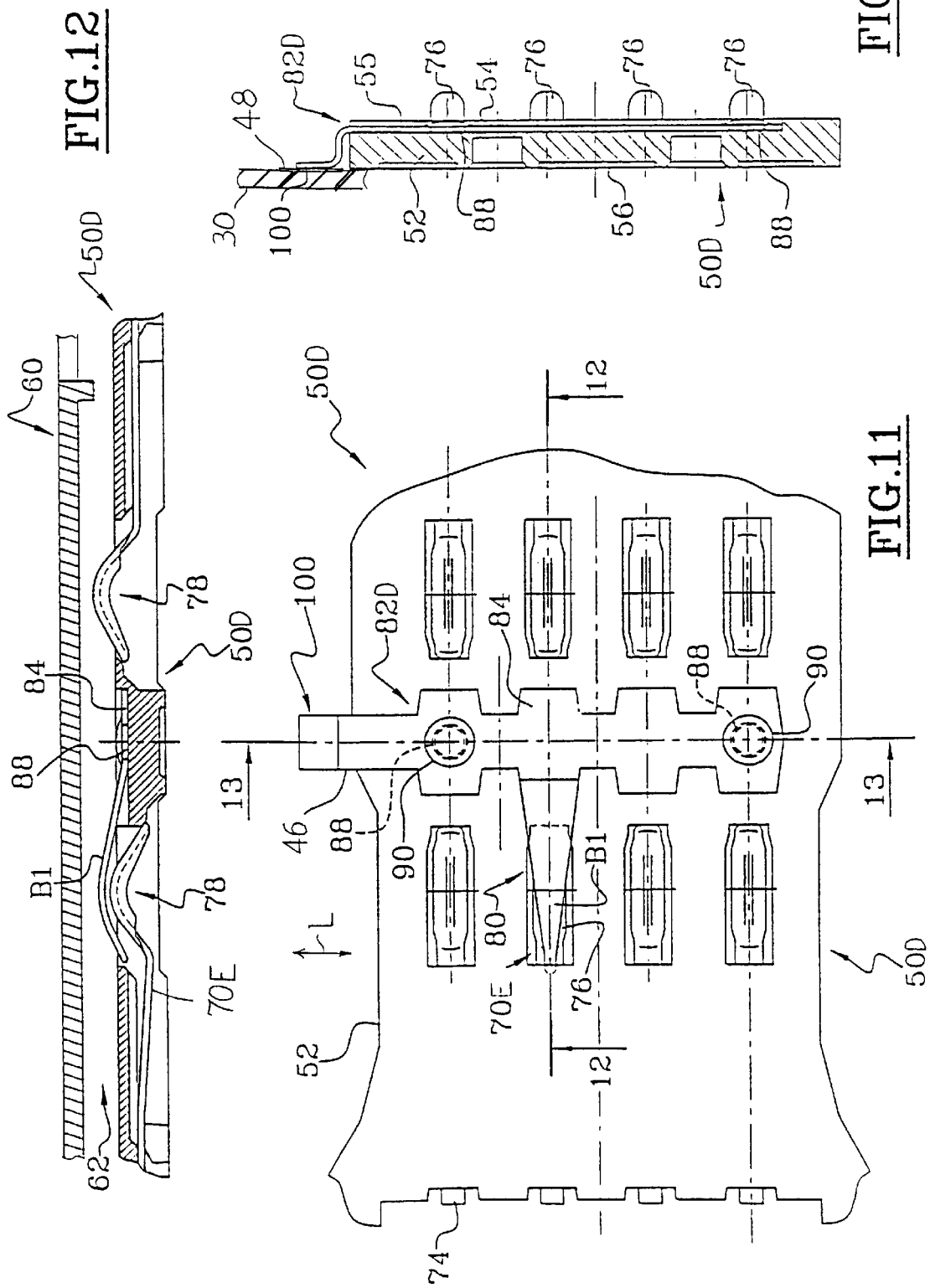

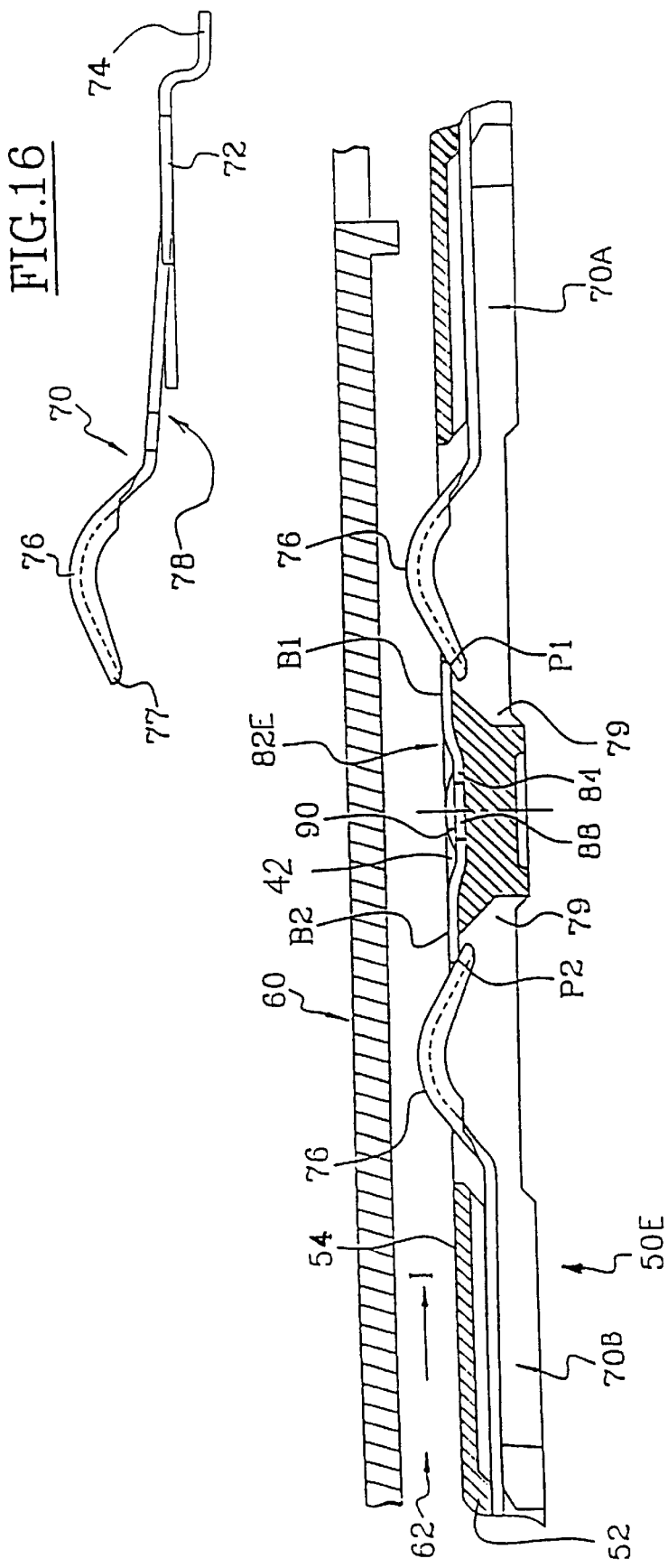

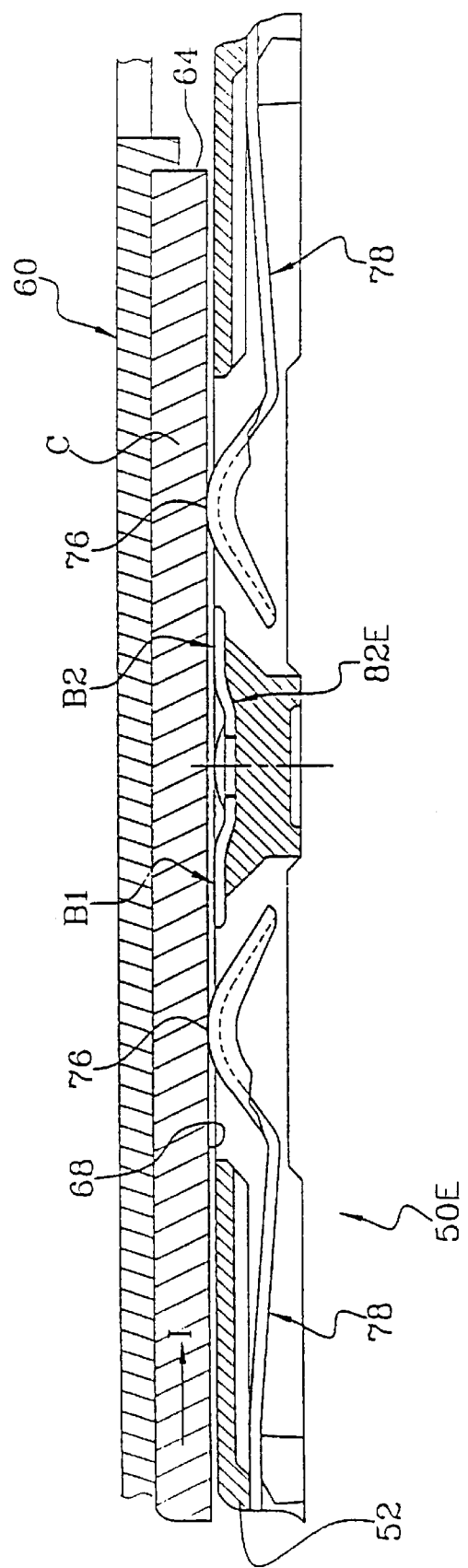

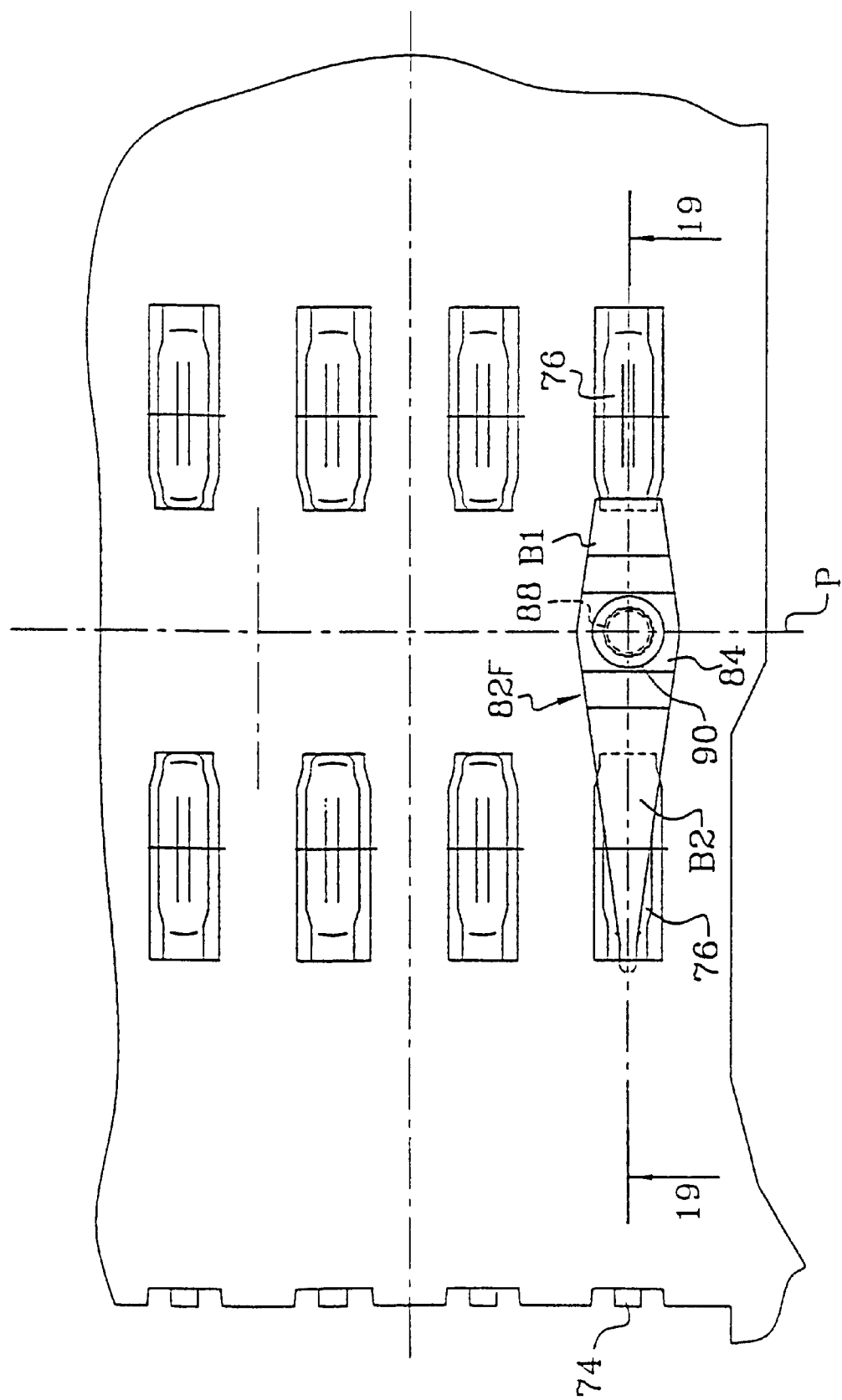

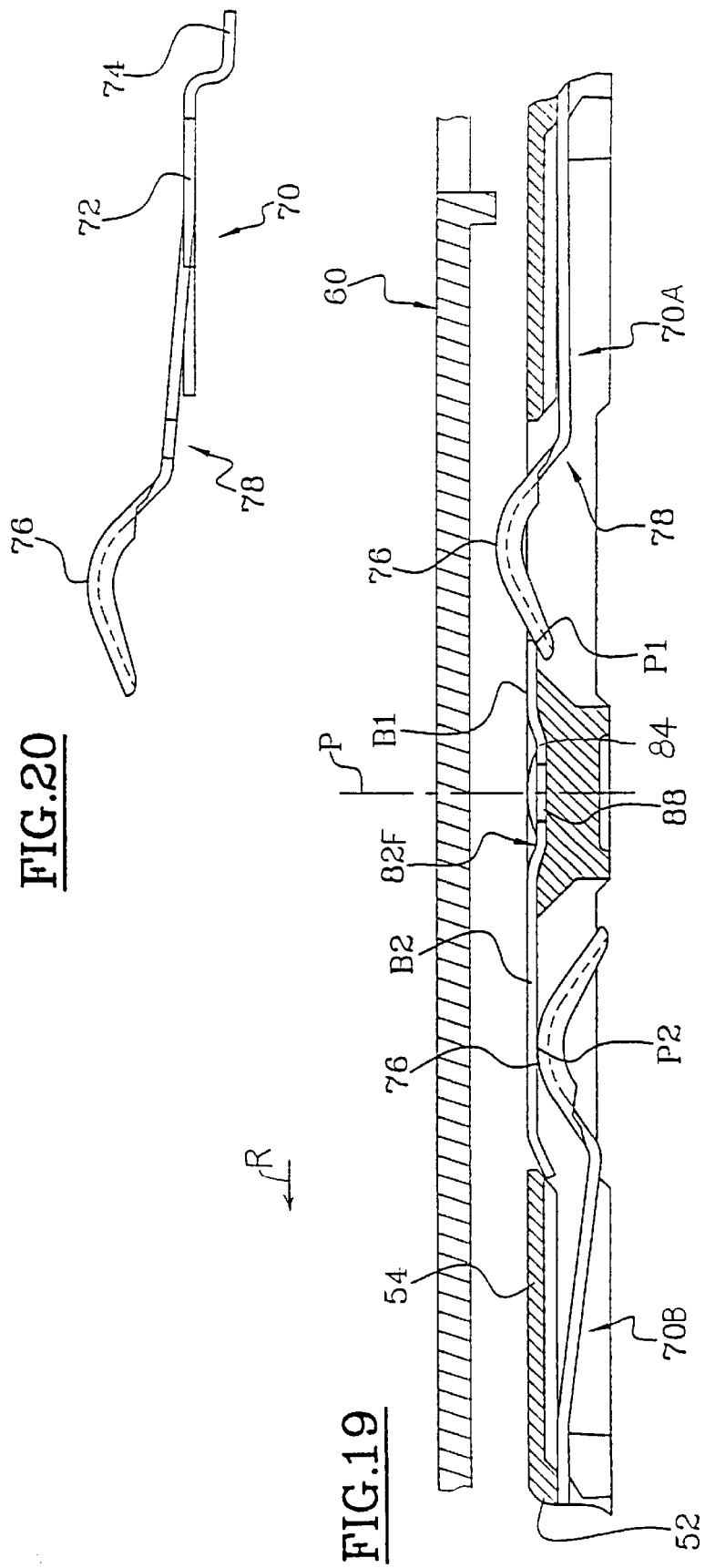

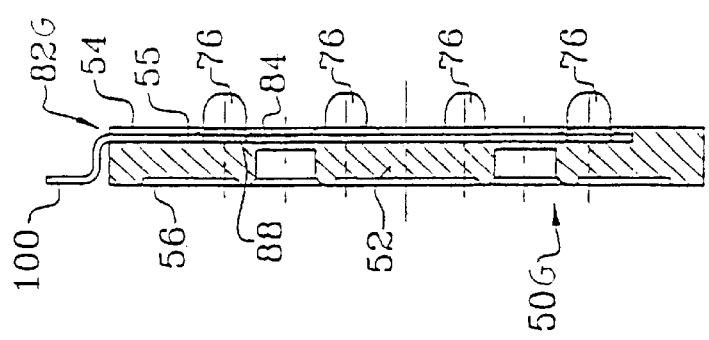
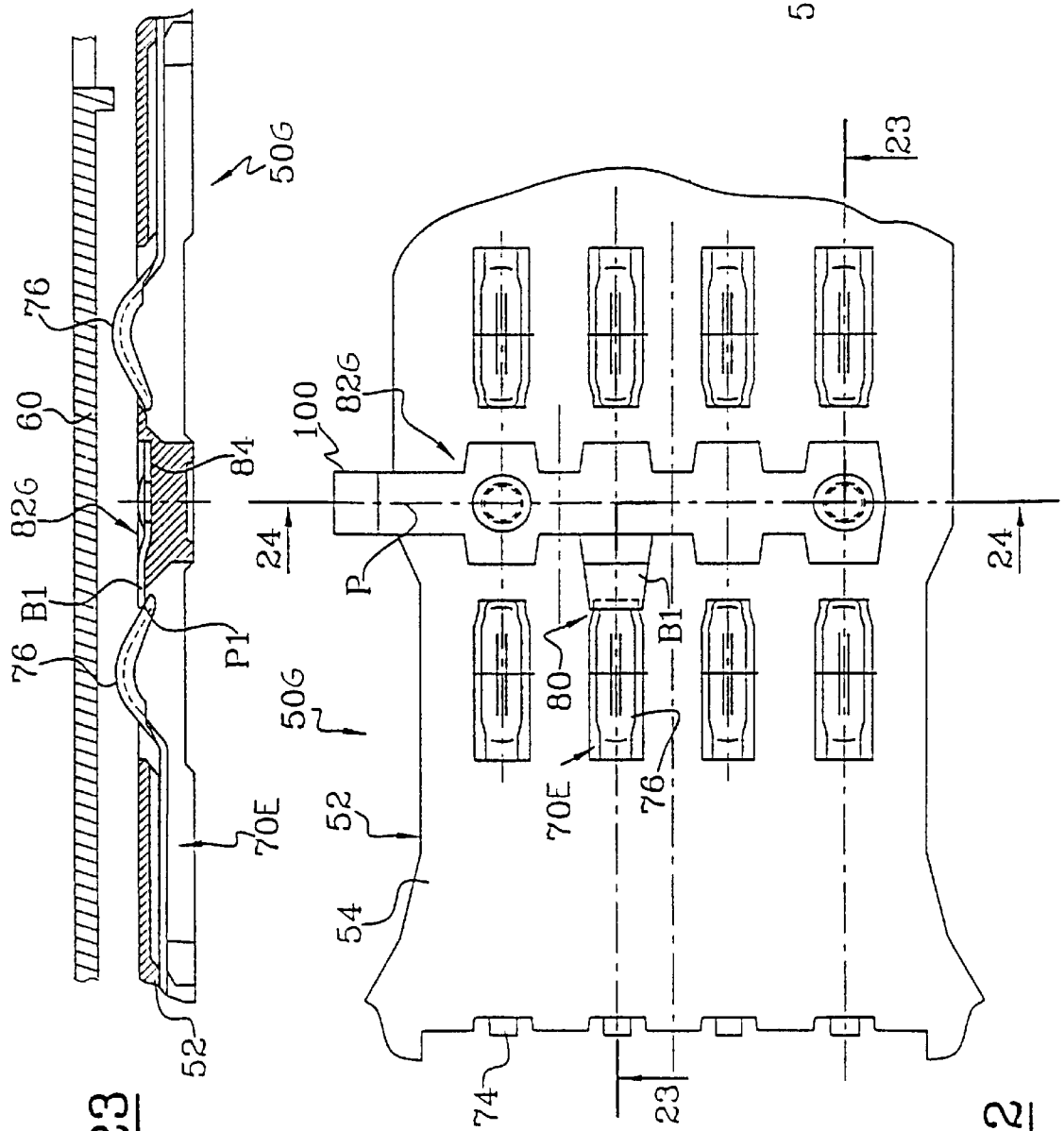
FIG.24
FIG.23
FIG.22

CARD DETECTING CONNECTOR

CROSS-REFERENCE TO RELATED APPLICATION

This is a divisional application of Ser. No. 09/810,725 filed Mar. 16, 2001, which is a continuation-in part of PCT/EP/06847 filed Sep. 16, 1999 which claims priority from French application number 98-11788 filed Sep. 22, 1998.

BACKGROUND OF THE INVENTION

Smart cards, or circuit cards, have one or more integrated circuits embedded in a card, the card having an active face with a plurality of pads that connect to the integrated circuit. A common arrangement includes eight pads arranged in four columns and two rows. An electrical connector for connection to the cards is commonly mounted on a circuit board and enables connection of the card pads to a read/write circuit. Such connectors commonly include an electrically insulative support or frame having an upper face, and a series of contacts with engaging ends projecting above the upper face. Each contact is resilient so its engaging end can be depressed to a height substantially flush with the surrounding frame upper face. Of course, a frame can be in any orientation, as where the "upper" face faces downwardly and the contact engaging ends project below the face.

A card may be slid in a longitudinal horizontal direction parallel to the plane of the frame upper face to engage the contacts. The card may instead be moved down or pivoted down against the frame upper face and therefore against the contacts. Many card connectors include an electrical switch for detecting the presence of a card as it approaches a fully inserted position. Such a switch can make or break a switching circuit.

One type of switch includes a special actuator that is deflected by a card so the actuator engages a special terminal or snaps down a dome contact. Such prior art switch requires a pair of special switch blades whose shape and mounting procedure is different from the contacts that engage the contact pads of the card. Such special switch blades have separate tails that must each be soldered to traces on a circuit board. The need to manufacture two separate switch contacts, mount them on the connector frame, and solder their tails to circuit board traces, adds to the cost of the connector.

SUMMARY OF THE INVENTION

In accordance with one embodiment of the present invention, applicant adds a switch to a smart card connector at minimum cost by minimizing the number of special components and simplifying the mounting of such components. This is accomplished by providing a switch blade that is mounted on the insulative frame and that makes or breaks engagement with at least one of the contacts that are substantially identical to those used to engage the contact pads of a smart card. Only a single switch blade is necessary, and in some embodiments the switch blade is not directly connected to a trace on a circuit board, since the contacts that it engages are already constructed to be soldered to traces on the circuit board. In a common type of smart card with eight contacts, this allows six or more of the contacts to be used to carry signals and/or power.

The switch blade can be mounted in a shallow depression in the upper face of the connector frame and have a pair of branches that interact with the engaging ends of two contacts. In one arrangement, both branches of the contact blade lie above and out of engagement with the engaging ends of two contacts. The branches are depressed by a card into engagement with the engaging ends of both contacts. In another arrangement, only one of the switch blade branches is depressed by a card against a contact, while the other branch is in constant engagement with the other contact. In a normally open switch, the two branches are positioned so the engaging ends of the two contacts each are biased up against one of the branches. Then, a card that depresses the two engaging ends, depresses them out of engagement with the branches of the switch blade.

The switch blade can be of minimal length and interact with a pair of contacts in a single column. However, the switch blade can be of longer length to interact with contacts lying in different columns.

In one arrangement, the switch blade has one branch that interacts with one contact, and has another branch that extends to a side of a connector and down along the side to form a tail that is soldered to a trace on a circuit board.

The novel features of the invention are set forth with particularity in the appended claims. The invention will be best understood from the following description when read in conjunction with the accompanying drawings.

BRIEF DESCRIPTION OF THE DRAWINGS

FIG. 4 is a plan view of a connector of another embodiment of the invention, showing the branches of the switch blade interacting with contacts lying in different columns.

FIG. 5 is a sectional view taken on line 5—5 of FIG. 4.

FIG. 6 is a plan view of a connector which differs from that of FIGS. 4 and 5 by the branches of the switch blade engaging contacts of the same row but adjacent columns.

FIG. 7 is a view taken on line 7—7 of FIG. 6.

FIG. 11 is a partial plan view of a connector of another embodiment of the invention, wherein the switch blade has only one branch that interacts with a contact, and its other branch is positioned to be soldered to a trace on a circuit board.

FIG. 12 is a sectional view taken on line 12—12 of FIG. 11.

FIG. 13 is a section view taken on line 13—13 of FIG. 11, and showing a portion of the circuit board.

FIG. 15 is a sectional view taken on line 15—15 of FIG. 14.

FIG. 16 is a side elevation view of one of the contacts of the connector of FIG. 15.

FIG. 17 is a view similar to that of FIG. 15, but with a card fully inserted in the connector.

FIG. 18 is a partial plan view of a connector of another embodiment of the invention, wherein one branch of the contact blade is in constant engagement with one contact and the other branch engages another contact until that contact is depressed.

FIG. 19 is a sectional view taken on line 19—19 of FIG. 18.

FIG. 20 is a side elevation view of one of the contacts of FIG. 19.

FIG. 22 is a partial plan view of a connector of another embodiment of the invention, of a normally closed switch wherein one branch of the contact blade forms a tail for soldering to a circuit board.

FIG. 23 is a view taken on line 23—23 of FIG. 22.

FIG. 24 is a sectional view taken on line 24—24 of FIG. 22.

DESCRIPTION OF THE PREFERRED EMBODIMENTS

Figure 1:
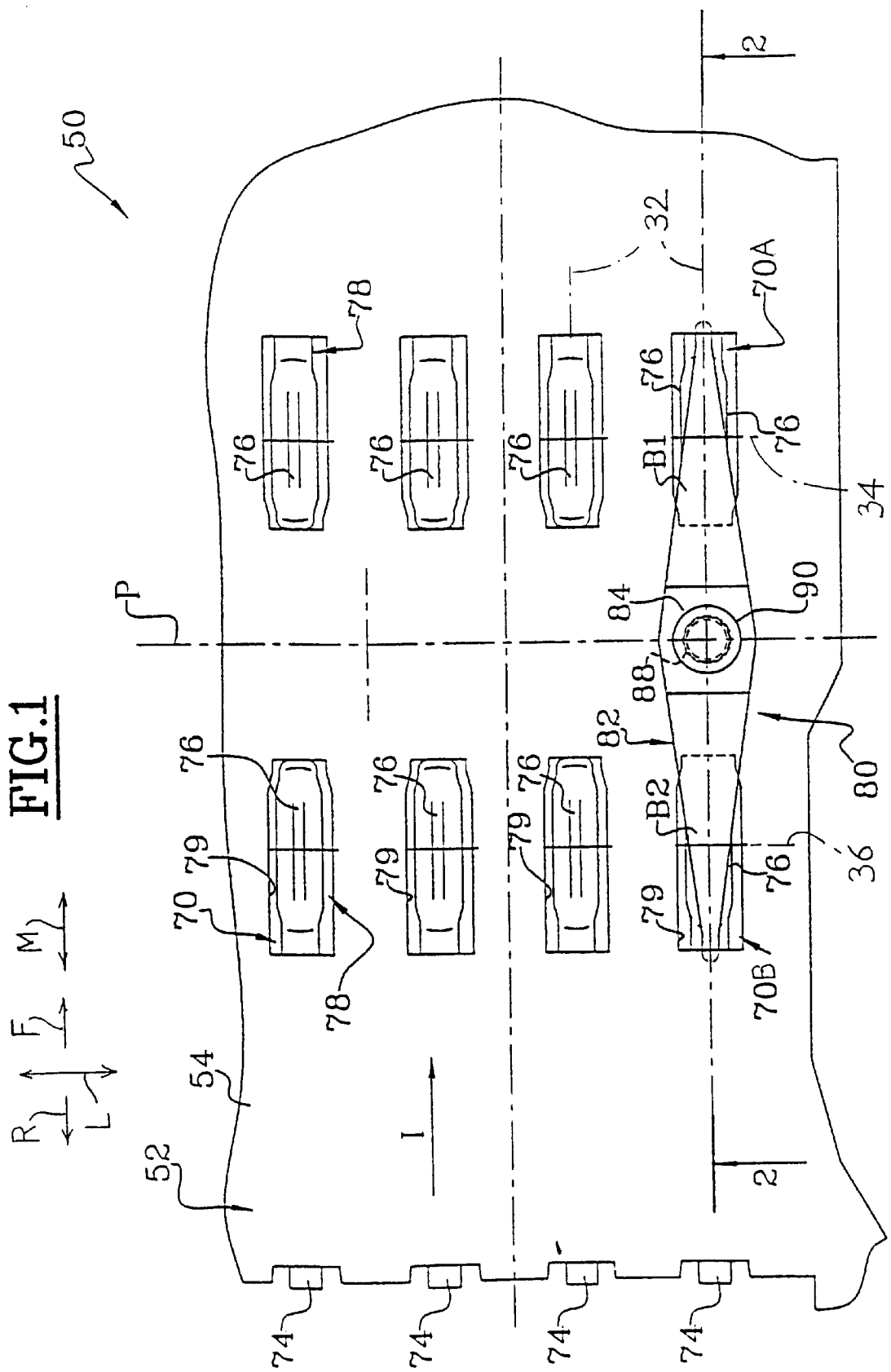
FIG. 1 is a partial plan view of a smart card connector with a switch blade to enable card detection, wherein both branches of the switch blade are initially out of engagement with two of the contacts.
Figure 2:
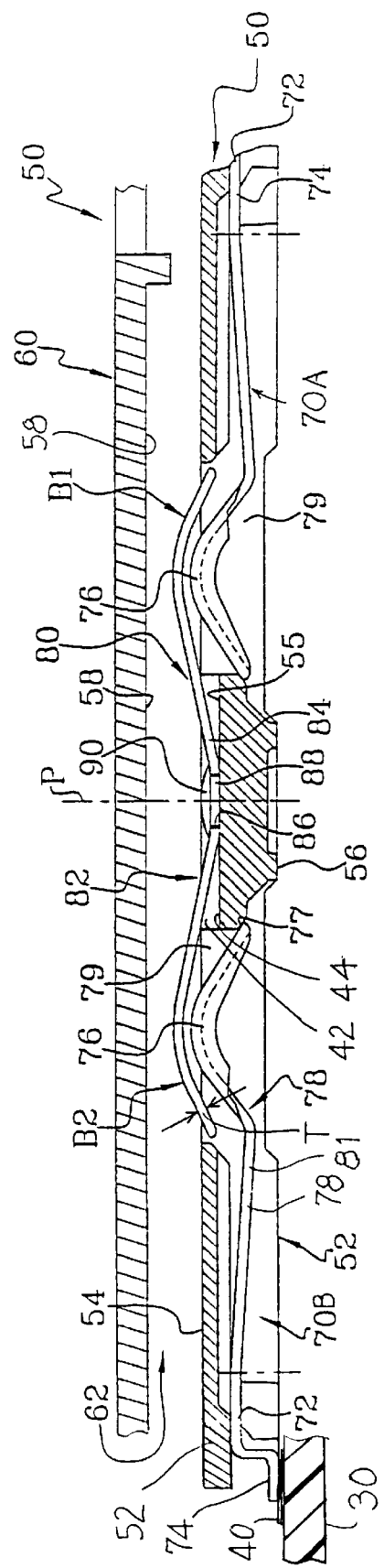
FIG. 2 is a sectional view taken on line 2—2 of FIG. 1, and showing an element for holding down a card.
Figure 3:
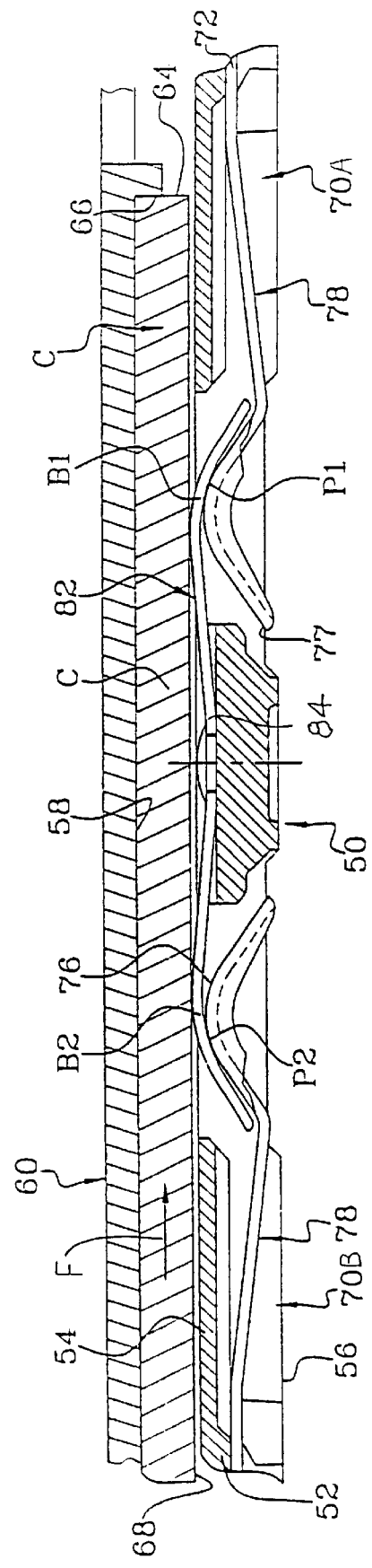
FIG. 3 is a view similar to that FIG. 2, but with the smart card fully installed and the switch closed.
Figure 25:
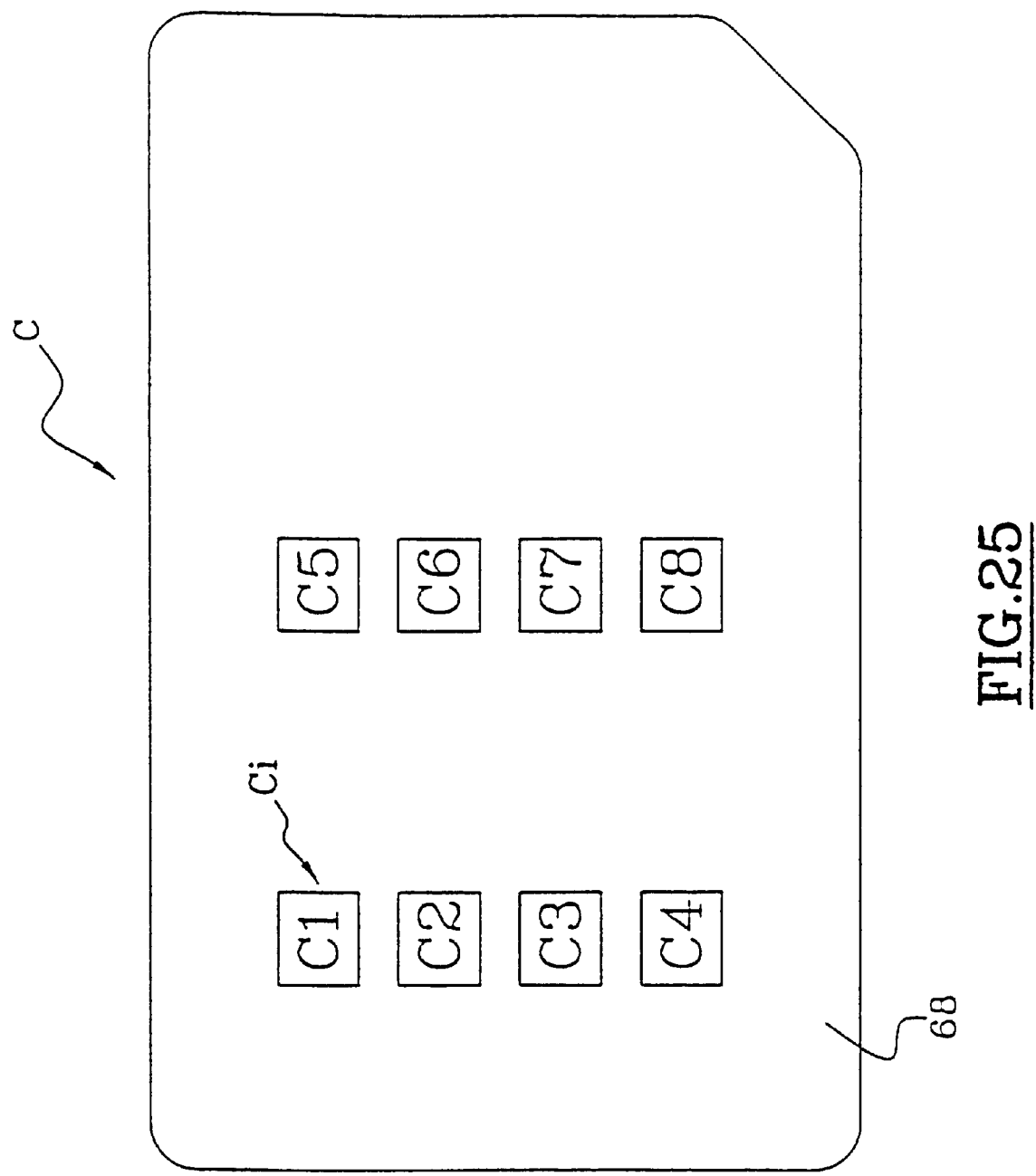
FIG. 25 is a bottom view of a smart card of the MICRO-SIM type showing the arrangement of contact pads thereon.

FIGS. 1–3 show an electrical connector 50 of a type that has multiple contacts 70 for engaging contact pads of a circuit, or smart card. FIG. 25 shows a MICROSIM Card which has an active face 68 containing contacts Ci which are numbered C1–C8. The contact pads are connected to an integrated circuit (not shown) embedded in the card, and the purpose of the connector is to engage the contact pads so data can be read out and written into the integrated circuit in the card. In many situations, signals are transmitted to only a few of the eight contact pads.

FIG. 1 shows that the connector 50 includes a plate-shaped support, or frame 52 formed of electrically insulative material. The frame is preferably a single part molded of plastic. The frame has a planar upper face 54. FIG. 2 shows that the frame 52 also has a lower face 56 which is designed to bear against a surface of a printed circuit board 30. It is noted that a hold-down element 60 lies above the upper face 54 of the frame, to hold down a card that lies in a slot 62 between a lower face 58 of the hold-down element and the upper face 54 of the frame. The card may be forwardly F slid into plane, or may be pivoted or moved down to its final inserted position in the slot.

The connector includes a plurality of contacts 70 (FIG. 1) that are arranged in four columns 32 (FIG. 1) and two rows 34, 36. Each of the contacts has a conventional shape such as shown in FIG. 16, with a fixing part 72 that is fixed to the frame, a termination part or tail 74 designed to be soldered to a circuit board, a free end portion 78 that can be deflected and that bends, an engaging end 76 that may engage a pad on a card, and a tip or nose 77. FIG. 2 shows the fixing part 72 is fixed in the frame and the tail 74 is soldered to a trace 40 on the circuit board. The engaging end 76 projects slightly above the upper face 54 of the frame, while the nose 77 abuts the frame to fix its initial position. A region of the portion 78 of a contact extending from the fixing part, tends to extend horizontally from the fixing part 72, and has been bent downward, so the engaging end 76 is biased upwardly. The engaging end 76 extends from the nose 77 to a location 81 that lies under the bottom of the slot walls.

In accordance with the present invention, the connector includes an electrical switch 80 that detects insertion of a card, and that is easily installed and adds minimal cost to the connector. The switch includes a switch blade 82 that has a fixing part 84 and a pair of branches B1 and B2. In FIG. 2, the branch B1 extends in a forward F direction from the fixing part, while the branch B2 extends in a rearward R direction from the fixing part. The front and rear directions are longitudinal M directions. Each branch B1 and B2 lies over the engaging end 76 of a contact 70A, 70B. Each branch initially is out of engagement with the corresponding contact. However, engagement of the branches with the contacts occurs when the card is fully inserted, as shown in FIG. 3 where the card C is inserted until its front edge 64 engages a stop 66 on the hold-down element. When the card is inserted, the branches B1 and B2 are depressed against the pad-engaging ends 76 of the contacts 70A, 70B. This establishes contact points P1 and P2 where each branch makes contact with a corresponding one of the contacts. If the card is inserted in a forward direction F, then the card first depresses the branch B2 to establish contact point P2, but the switch is not yet closed. Further card insertion results in depression of the branch B1 to establish the contact point P1, which closes the switch.

As shown in FIG. 2, the fixing part 84 of the switch blade lies in a recess 42 in the upper face of the frame, and against a recess bottom wall 44. The outline of the recess is substantially the outline of the switch blade. A stud or post 88 projects through a hole 86 in the switch blade, and a head 90 of the post holds the fixing part of the switch blade. The post 88 is preferably initially molded with the rest of the frame 52. After the switch blade is inserted, the top of the post can be deformed as with heat, to form the head. It is also possible to use a separate post, although this is not preferred.

The use of the switch blade 82 provides a switch at minimal additional cost in the production of the connector, where the connector is already designed with the contacts but without a switch. Only a single switch blade 82 is added to the connector, in addition to the recess. Where the switch blade is not separately connected to a trace on the circuit board, there is no need for an additional trace on the circuit board or tail on the switch blade to engage such a trace.

It is noted that the connector illustrated in FIG. 1, is symmetric about a vertical plane P that extends in a lateral L direction as shown in FIG. 1. Except for the switch blade 82, the connector is also symmetric about a transverse vertical plane. All contacts 70 other than those 70A, 70B used for switching purposes, are available to engage contact pads on the card. However, all contacts, including the switch contacts 70A, 70B are identical and are mounted on the frame in the same way. Both the contacts and the switch blade 82 are formed of sheet metal. It is noted that in the undeflected positions of FIG. 2, the engaging ends 76 of the contacts are in the form of upside-down spoons with their convex faces facing upward and projecting through a slot 79 in the frame. All slots 79, including the two for the switch contacts and the six other contacts are identical. As shown in FIG. 2, each of the branches B1, B2 has a curved profile complimentary to that of the contact ends 76. That is, each branch has a concave side facing the upper surface of the engaging end of a contact. The domed profile of each branch end limits the distance above the frame upper face 54 that the branches must extend. The rear end of the second branch B2 lies below the frame upper face 54. The branches, especially the rear one B2 are formed to be easily downwardly deflected by a card, to avoid longitudinal compression.

FIG. 3 shows that the branch B1 bends primarily about points near its fixing location 84 which is rearward of the corresponding contact point P1. The contact 70A bends primarily about locations near its fixing part 72 which is forward of the contact point P1. This results in sliding of the branch B1 against the contact. Such sliding is desirable in helping to remove oxides that might form on the surface portions that engage one another at the point P1.

FIGS. 4 and 5 illustrate a connector 50A of another embodiment of the invention, showing a switch blade 82A with its two branches B1 and B2. The branches B1, B2 are positioned over contacts 70C, 70B that lie in two different columns that are laterally L spaced, so the branches are laterally offset. FIG. 5, which is a sectional view taken along the dogleg line 5—5 of FIG. 4, is similar to that of FIG. 2. It is noted that in FIG. 4, the switch blade is held down by two laterally-spaced posts 88.

FIGS. 6 and 7 illustrate a variation of the connector of FIG. 5, with the connector of FIG. 6 having a switch blade 82B with two branches B1 and B2 that engage contacts 70D and 70B that are laterally L but not longitudinally spaced, and that lie in the same row but in two different columns. The arrangements of FIGS. 4–7 allow selected contacts to be used so the other contacts can send signals and/or power to selected contact pads of the card.

Figure 8:
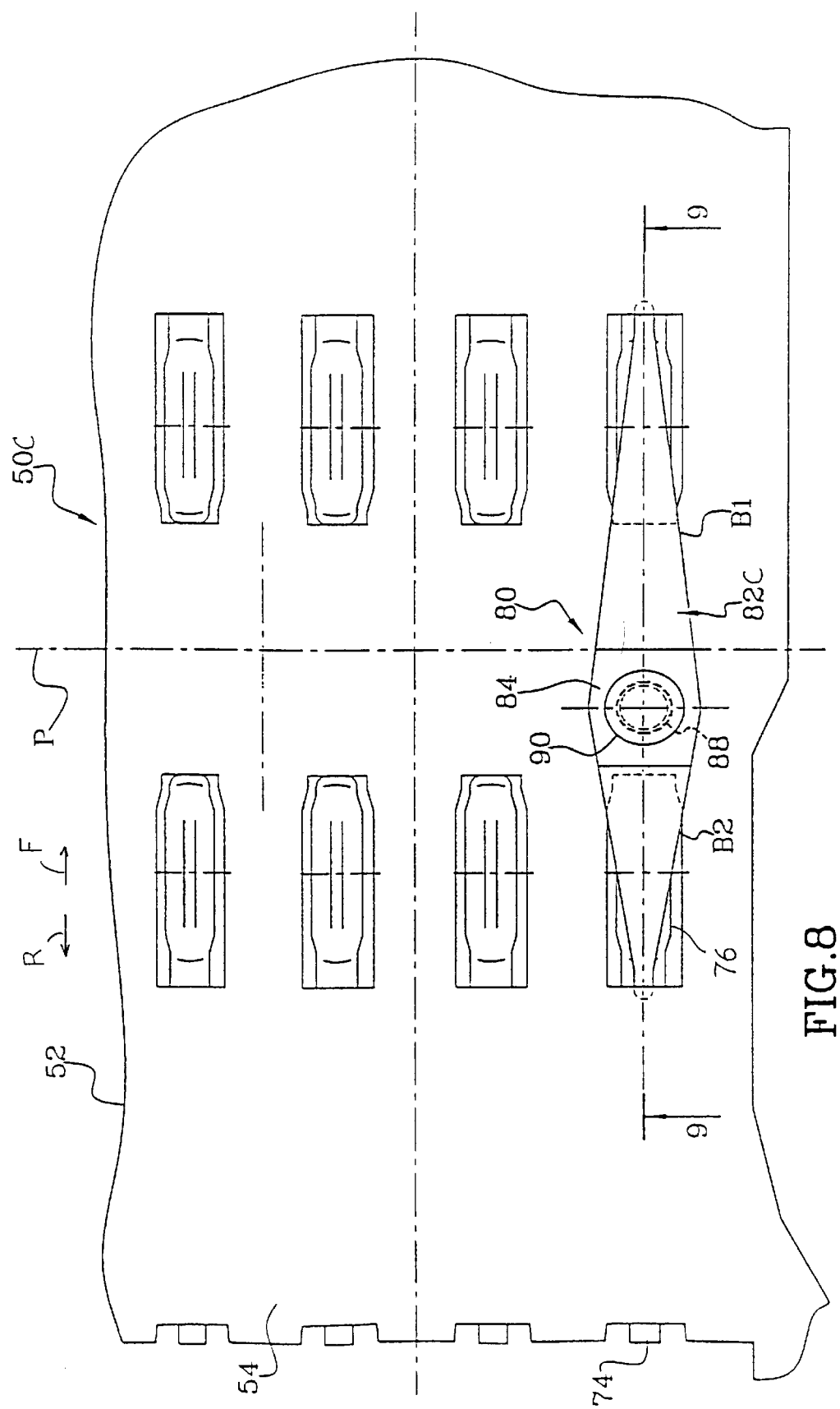
FIG. 8 is a partial plan view of a connector another embodiment of the invention, wherein one branch of the switch blade is in constant engagement with a contact and the other branch is depressed into engagement with another contact by the presence of a card.
Figure 9:
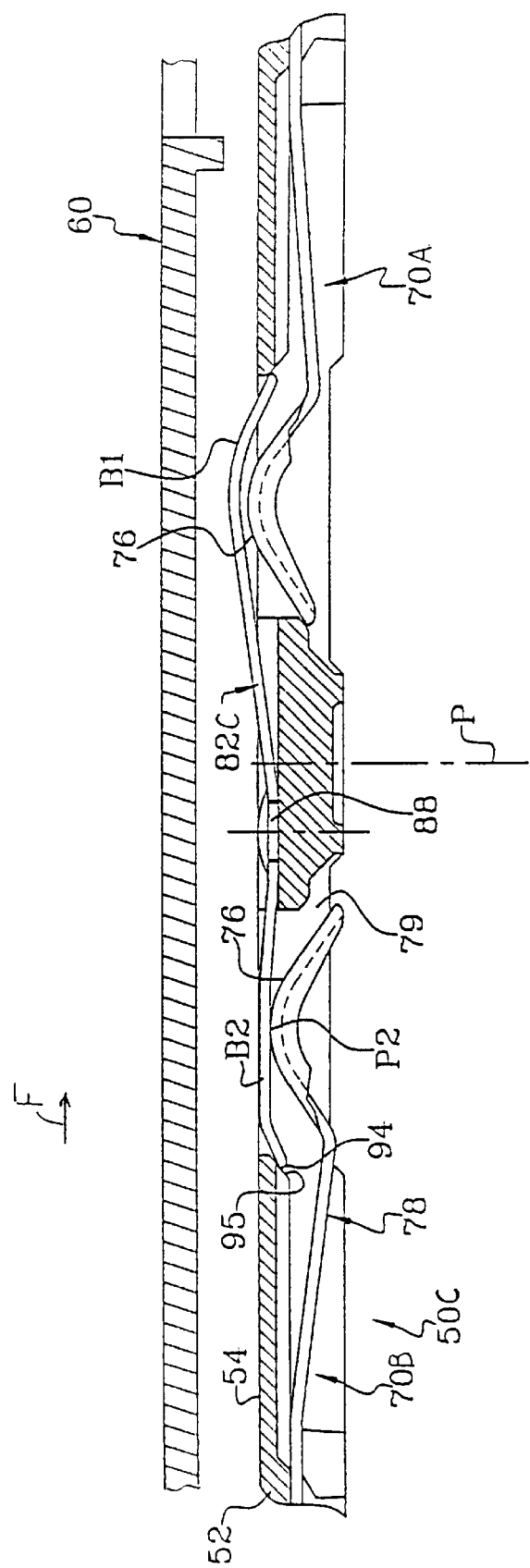
FIG. 9 is a sectional view taken on line 9—9 of FIG. 8.
Figure 10:
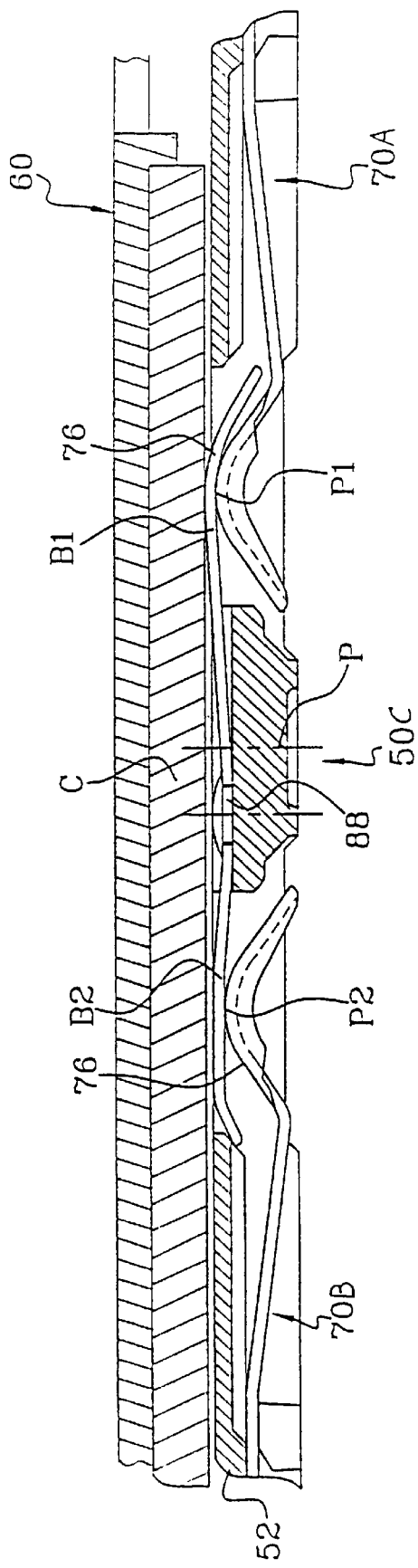
FIG. 10 is a view similar to that of FIG. 9, but with a card fully installed.
Figure 14:
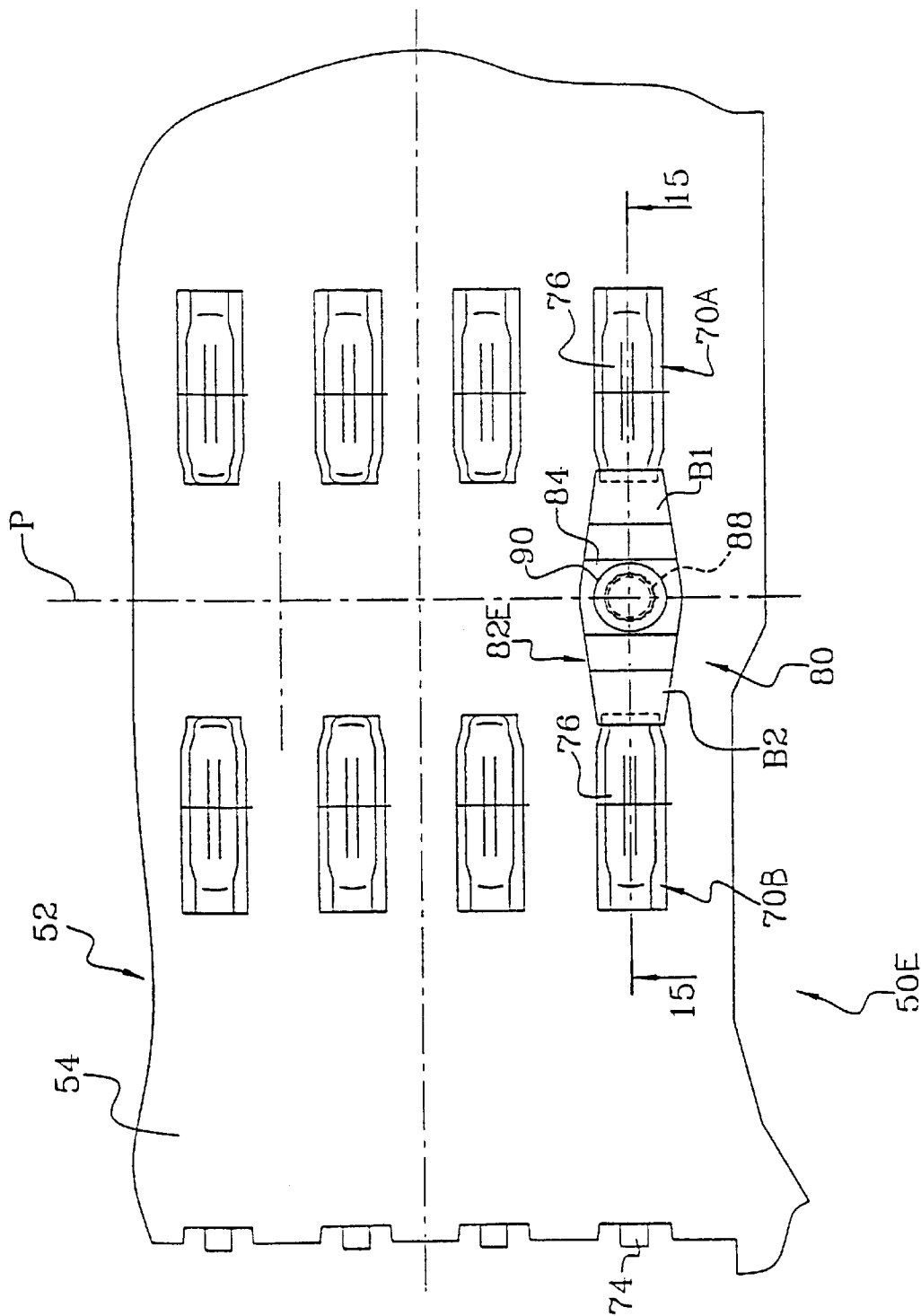
FIG. 14 is a partial plan view of a connector of another embodiment of the invention with a normally closed switch, wherein the switch blade has rigid branches that are normally engaged with a pair of contacts and the contacts are deflected out of engagement with the branches.

FIGS. 8–10 illustrate a fourth embodiment of the invention, wherein the switch blade 82C is unsymmetrical with respect to the transverse plane of symmetry P. The fixing part 84 is offset rearwardly from the plane P. This results in a longer branch B1 and shorter branch B2. As shown in FIG. 9, the shorter branch B2 has a free end 94 that is held down by a shoulder 95 of the frame, resulting in its constant engagement with the contact 70B. As a result, little or no resilience is required for the branch B2. However, the branch B1 is intended to be downwardly deflected by the card, and its longer length results in it having a greater resilience. It is noted that the branch B1 which is the only one to be downwardly deflected by the card, is the branch that extends forwardly F from the fixing part, so there is no likelihood that the branch B1 will be compressed into column collapse as a card inserted or withdrawn.

FIGS. 11–13 show a connector 50D wherein the switch blade 82D has only a single switching branch B1 that interacts with a contact 70E. The switch blade has a lateral L extension 46 with a tail 100 for soldering to a trace 48 on a circuit board 30. The trace 48 is preferably grounded. The branch B1 is initially out of engagement with the contact 70E, but is pressed into engagement to close the switch when a card is fully inserted. This arrangement enables seven of the total of eight contacts to be used to carry signals and/or power between the pads of the card and a read/write circuit, although the branch B1 carries a ground signal to a pad. It is noted that in FIG. 25, it is the contact pad C6 that is connected to the branch B1 and will be grounded if the trace 48 that engages the switch contact tail 100 is grounded. It is noted that it is possible to form a tail similar to 100 at laterally opposite sides of the switch blade.

FIGS. 14–17 illustrate a connector 50E of a sixth embodiment of the invention wherein the switch blade 82E is of the normally-closed type. The switch blade 82E is of symmetrical design and has two longitudinally opposite branches B1, B2. Each branch has a free end that normally engages the contact end 76 of an associated contact 70A, 70B. As shown in FIG. 15, the two branches of the switch blade each extends in a horizontal plane and lies within the recess 42 in the frame. Operation of the switch does not rely upon resilient deformation of either branch B1 or B2, so the switch blade does not have to bend. The dome contact ends 76 of the contacts are biased upward against the free ends of the switch blade branches. This results in contact points P1 and P2 that remain in the absence of a card.

When the card has been inserted, as illustrated in FIG. 17, the card depresses the domed ends 76 of the contacts to depress them. This opens the switch by breaking the contact points P1 and P2 of FIG. 15. The contact point P2 is broken first, causing the switch to open, with the other contact point P1 broken last and "confirming" such switch opening. When the card is removed, the contact points P1 and P2 are successively reestablished. The shape of branches B1 and B2 assures that in the presence of the card as in FIG. 17, no part of the switch blade will touch the card. This is because the switch blade 82E lies no higher than the upper face 54 of the frame, and because the contact ends 76 press the card upwardly. The contacts 70A, 70B each can be used to carry signals and/or power when the card is inserted.

Figure 21:
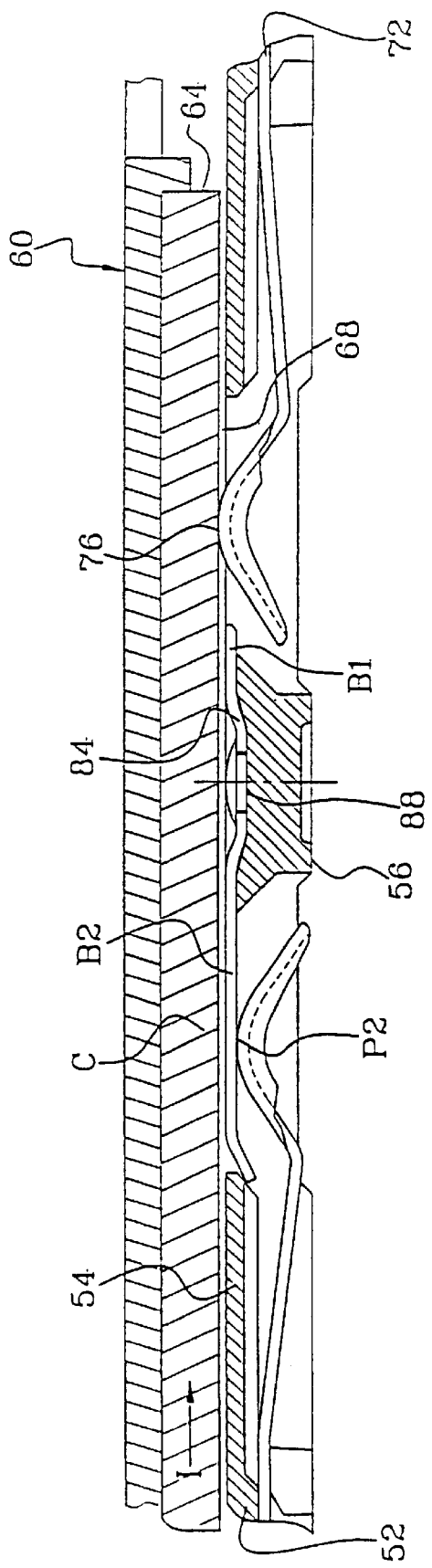
FIG. 21 is a sectional view similar to that of FIG. 19, but with a card fully inserted.

FIGS. 18 to 21 illustrate a normally-closed type switch with an unsymmetrical switch blade 82F. As shown in FIG. 19, the longer branch B2 extends rearwardly from the fixing part 84 and above the engaging end of the contact. The branch B2 continually depresses the contact engaging end to establish a contact point P2 that is continuously closed, whether or not a card is present. The other branch B1 is short and engages the contact only until a card is inserted. FIG. 21 shows that when a card is inserted, the switch opens and the contact end 76 is depressed out of engagement with the branch B1 to open the contact point P1. In this embodiment of the invention, the leading edge of the card never engages the branch B2, which lies slightly below the plane of the upper face 54 of the frame.

FIGS. 22–24 show another normally-closed switch, which has a switch blade 82G that engages the engaging, or free contact end 76 of only a single contact blade 70E of the connector 50G. The switch blade has a single switching branch B1 that establishes a point of contact P1 with the free end 76 of a contact 70E in the absence of a card. When a card is inserted, the free end of contact 70E is depressed and the switch is opened. Once the contact 70E is depressed, it can serve as a contact that engages a contact pad on the card and through which high frequency signals and/or power can be transmitted, in the same manner as the other seven contacts. This arrangement enables all eight contact blades to be connected to a read/write circuit. The switch blade 82G is grounded through a tail 100, and therefore the contact 70E is grounded prior to engaging a contact pad.

In all of the above embodiments of the invention, such as that shown in FIG. 2, the head 90 of the post that holds down the fixed part of the switch blade, lies at the height of the upper face (within a few thousandths inch of the plane of the face 54) or slightly below the upper face. The top of the head 90 preferably lies within a distance below the upper face 54 that is no more than twice the thickness T of the sheet metal of the switch blade 82 and more preferably within the thickness of the sheet metal. Such thickness T is commonly about 0.008 inch. As a result, there is only a slight reduction in the thickness and strength of the frame part that lies below the post.

An advantage of the above switches of the connectors is that all contacts can be substantially identical. This makes it possible to retain the same manufacturing process for all contacts of a switching connector and for all contacts of a connector that does not have a switching function. It allows mounting of all contacts, whether for switching or not, in the same manner, and allows the traces on the circuit board that engage the tails of the contacts, to lie in a limited number of rows, such as two rows. The orientation of the branches of the switch blades can be in any direction relative to the direction of insertion of the card, although for those switch blades that are to be depressed by the card, applicant prefers that the branches be elongated parallel to the direction of card insertion and withdrawal where cards are slid into position instead of lowered.

Although terms such as "top", "depressed", etc. have been used to help describe the invention as it is illustrated, it should be understood that the connectors can be used in any orientation with respect to Earth.

Thus, the invention provides an electrical connector for engaging contact pads on the active face of a smart card, which includes a switching function that adds a minimum number of parts, and with parts that are easily mounted. The switch includes an electrically conductive switch blade that is fixed to the frame in a recess in the top face of the frame, and that has at least one branch that interacts with one of the contacts of the connector. The branch can initially lie out of engagement with the contact, with the branch being depressed into engagement by insertion of a card. Instead, the branch can be fixed in position with the contact biased upwardly against it, and with the contact being depressed out of engagement with the switch blade branch by insertion of a card. All contacts of the connector can be identical, with one or two of them being used for the switching function. The contact engaging ends are resiliently depressable, and the switch blade interacts with the resiliently depressable engaging ends. It is possible to have all eight contacts connected to a read/write circuit and still obtain a switching function.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. An electrical connector for making electrical connections with contact pads on the active face of a circuit card, comprising:

an insulative frame with a frame face for substantially engaging said card active face, and a plurality of contacts mounted on said frame and having engaging ends lying above said frame face and being resiliently depressable to positions substantially no higher than flush with said frame face;

a switch that includes an electrically conductive switch blade that is fixed to said frame and that has a first switch branch that lies in engagement with the engaging end of a first of said contacts before said first contact is depressed by a card, with said first contact having a fixed part that is fixed to said frame and a cantilevered free end portion that extends from said fixed part to said engaging end and that is depressable by a card out of engagement with said first switch branch by bending of said cantilevered free end portion.

2. The connector described in claim 1 wherein:

said contacts are arranged in a plurality of columns that each has at least two of said contacts, with all of said contacts including said first contact, being identical to one another.

3. The connector described in claim 1 wherein:

said frame has a plurality of slots at said frame face, and a plurality of said contact engaging ends project upward through said slots and each has a free tip;

said frame face has a recess with a bottom wall;

said first switch branch lies in said recess and projects over an end of one of said slots and engages a free tip of said first contact to depress said first contact engaging end slightly while said first contact engaging end remains above said frame face, until said contact engaging end is depressed by a card.

4. The connector described in claim 1 wherein:

said switch blade is in constant engagement with a second of said contacts.

5. An electrical connector for making electrical connections with contact pads on the active face of a circuit card, comprising:

an insulative frame with a frame face for substantially engaging said card active face, and a plurality of contacts mounted on said frame and having engaging ends lying above said frame face and being resiliently depressable to positions substantially flush with said frame face;

a switch that includes an electrically conductive switch blade that is fixed to said frame and that has first and second switch branches that lie in engagement respectively with first and second of said plurality of contacts before said first and second contacts are depressed by a card, with said contact engaging ends being depressable by a card out of engagement with said switch branches to open said switch.

6. The contact described in claim 5, wherein:

said frame has a recess in said frame face;

said switch blade is formed of sheet metal of predetermined thickness and has a fixing part fixed to said frame and lying in said recess, and said first and second branches have branch ends that engage said contacts with said branch ends each lying no higher than the height of said frame upper face.

7. An electrical connector for making electrical connections with contact pads on the active face of a circuit board, comprising:

an insulative frame with a frame face for substantially engaging said card active face, and a plurality of contacts mounted on said frame and having engaging ends lying above said frame face and being resiliently depressable to positions substantially no higher than flush with said frame face;

a switch that includes an electrically conductive switch blade that is fixed to said frame and that has a first switch branch that lies in engagement with the engaging end of a first of said contacts before said first contact is depressed by a card, with said first contact engaging end being depressable by a card out of engagement with said first switch branch;

said frame face faces upwardly and has a recess with a recess bottom wall, and said frame has a post projecting up from said bottom wall;

said switch blade has a mount part with a hole, and said post projects through said hole and has a head that holds said switch blade mount part against said bottom wall, said head having a top lying at about the height of said frame face.

* * * * *